United States Patent Office 3,385,670
Patented May 28, 1968

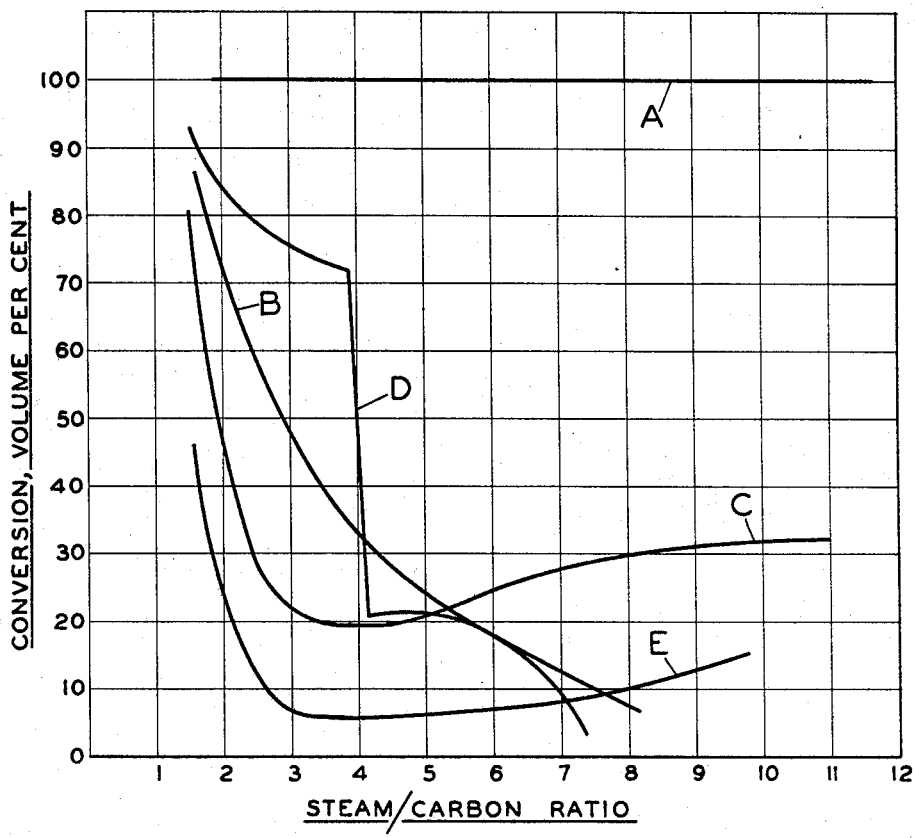

3,385,670
STEAM REFORMING OF HYDROCARBONS AND CATALYST THEREFOR CONTAINING A COBALT COMPONENT ON A ZIRCONIA SUPPORT
James P. Van Hook, Basking Ridge, N.J., and Thomas H. Milliken, New York, N.Y., assignors to Pullman Incorporated, Chicago, Ill., a corporation of Delaware
Filed Dec. 29, 1964, Ser. No. 421,813
10 Claims. (Cl. 23—212)

ABSTRACT OF THE DISCLOSURE

Catalyst composition consisting of elemental cobalt, cobalt oxide or mixtures thereof on a zirconia carrier and in which the content of cobalt, expressed as cobalt oxide, is from 0.5 to 15 weight percent of the total weight of the composition, and method for the steam reforming of hydrocarbons in the presence of the catalyst to produce hydrogen-containing products without substantial deposition of carbon on the catalyst.

---

This invention relates to the production of hydrogen by the conversion of hydrocarbons with steam in the presence of a particular contact material.

Steam reforming of hydrocarbons is a process by which a hydrocarbon and steam are contacted with a catalyst to produce gaseous product comprising hydrogen and carbon oxides and is well known to the art of hydrogen production. Catalysts which are used commercially for this reaction usually comprise nickel as the catalytic agent supported on or diluted with an oxidic refractory support comprising alumina such as aluminous cement containing magnesia and calcium oxide as binding agents. While such two-component catalysts may successfully be employed for steam reforming of normally gaseous paraffins at relatively low steam-to-carbon ratios, they are usually unsuitable under the same operating conditions for the conversion of feedstocks containing significant amounts of unsaturated compounds such as olefins and/or heavier, higher molecular weight paraffinic compounds because of considerable carbon deposition on the catalyst. The problem of carbon deposition during steam reforming of olefinic feedstocks such as refinery gases and coke oven gases and of normally liquid feeds is one well known to those skilled in this art. Although in recent years considerable effort has been expended to improve nickel catalysts so as overcome the carbon deposition problem and yet provide a process which can be operated at feasible levels of steam, very little attention has been devoted to the study of catalytic agents other than nickel since it is generally believed that nickel is the most suitable agent from the standpoint of catalytic activity.

It is an object of this invention therefore to provide a new and improved contact material particularly useful for the conversion of hydrocarbons with steam to produce hydrogen-containing gas.

Another object is to provide a particular contact material which allows for the steam reforming of normally liquid feeds and feeds containing substantial amounts of olefins at relatively low steam-to-carbon ratios without deleterious carbon deposition on the catalyst.

Another object is to provide a steam reforming catalyst having the above properties and which also allows for substantially complete conversion of the hydrocarbon feed in single pass operation.

Various other objects and advantages of this invention will become apparent to those skilled in the art from the accompanying description and disclosure.

In accordance with the teachings of this invention a new and improved contact material is provided composed of a cobalt component and zirconia which contact material is particularly useful for the steam reforming of hydrocarbons to produce gaseous product comprising hydrogen. It has been found that the catalysts of this invention allow for conversions of the hydrocarbon feed as high as 100 percent per pass and that they are active over a relatively wide range of steam-to-carbon ratios including relatively low ratios without deleterious carbon deposition on the catalyst.

The accompanying drawing is based on experimental steam reforming data obtained with a catalyst falling within the scope of this invention (line labeled A) and with other catalysts (lines labeled B through E) and shows a correlation of conversion of the hydrocarbon feed and steam-to-carbon ratios.

The catalysts of this invention contain the cobalt component in an amount between about 0.5 and about 15 weight percent, expressed as cobalt oxide and based on the total weight of the composition, the balance of the catalyst being zirconia. The term "cobalt component" as used herein is intended to include cobalt in elemental as well as in combined form. This component is usually present in the form of a member of the group consisting of elemental cobalt, cobalt oxide and mixtures thereof.

The term "zirconia" as used herein is intended to include supports containing from about 90 to 100 weight percent of zirconium dioxide, from 0 to 2 weight percent of titanium dioxide, from 0 to 2 weight percent of silicon dioxide, from 0 to 6 weight percent of either calcium oxide, magnesium oxide or combinations thereof, and from 0 to 0.5 weight percent of iron oxide. The presence of these other metal oxides depends largely on the source of the zirconia and does not substantially affect the catalytic properties for steam-hydrocarbon reforming. For example, when the zirconia component of the catalysts of this invention is derived from naturally occurring ores such as zirconium silicate, it usually contains residual, incidental impurities such as the oxides of titanium and silicon within the aforesaid amounts. These latter oxides are generally present as zirconium titanate and silicate, respectively. The calcium and magnesium oxides within the aforesaid amounts are usually found in commercially available zirconia of refractory grade since they are added as stabilizers of the thermal expansion properties of the refractory.

Substantially pure zirconia is prepared synthetically by precipitation of the hydrous oxide by treatment of zirconium salts such as zirconium nitrate, carbonate or sulfate, with aqueous alkaline solutions such as ammonium hydroxide. The precipitated hydrous oxide is dried, washed and, if desired, calcined at an elevated temperature such as between about 800° F. and about 1400° F.

The catalysts of this invention are prepared by treating the zirconia support either in the form of hydrous zirconia or dried or calcined zirconia with an aqueous solution of a compound of cobalt which is preferably thermally decomposable to cobalt oxide. The solution is added in an amount sufficient to provide between about 0.5 and about 15 weight percent cobalt, expressed as cobalt oxide, in the finished catalyst and preferably from about 1 to about 10 weight percent. Typical examples of suitable precursor compounds of the cobalt component are cobalt nitrate, cobalt sulfate and cobalt carbonate. After the zirconia support is treated with the aqueous solution of cobalt salt, the mass is dried and the dried composite is calcined to convert the salt to cobalt oxide, elemental cobalt or mixtures thereof. Drying is usually accomplished at a temperature between about 200° F. and about 400° F. for between about 1 and about 30 hours although shorter or longer periods may be used as required. Calcination is effected by heating the dried composite at a temperature of from about 600° F. to about 2000° F. and more usually at a temperature from about 800° F. to about 1200° F. in the presence of air or nitrogen to convert the salt to cobalt oxide, or in the presence of a hydrogen-containing reducing gas to convert at least a portion of the salt to elemental cobalt. Prior to use the catalyst can be pre-conditioned with a hydrogen-containing gas at a temperature between about 800° F. and about 1500° F., although such treatment is not essential to satisfactory performance of the catalyst.

The zirconia supported cobalt catalysts of this invention are useful for the steam reforming of a wide variety of hydrocarbon feeds including natural gas, olefinic feeds and normally liquid feeds. The feedstock may contain aliphatic and aromatic hydrocarbons from methane to high molecular weight compounds including acyclic and alicyclic paraffinic and olefinic compounds such as those containing up to about 40 carbon atoms and having molecular weights as high as about 560. The hydrocarbon feed may be a single hydrocarbon such as those of the homologous series, $C_nH_{2n+2}$ and $C_nH_{2n}$, for example, ethane propane, butane . . . dodecane, etc., and ethylene, propylene, butylene, etc., or mixtures thereof. The catalysts of this invention are particularly useful for the conversion with steam of feedstocks containing from about 5 to about 90, and usually not more than 80 mol percent of olefin including refinery gas and coke oven gas. Also included within the scope of this invention is the steam reforming of normally liquid feedstocks such as those containing 50 mol percent or more of $C_5$ and higher compounds. Typical examples of such feedstocks are the various petroleum fractions such as naphtha distillates including light naphtha (e.g., boiling range of 100°–250° F.), heavy naphtha (e.g., boiling range of about 200°–400° F.), gas oil (e.g., boiling range of 400°–700° F.) and other liquid and viscous feeds such as mineral oils and crude petroleum oils including topped and residual oil.

The relative amount of hydrocarbon and steam reactants is expressed as the steam-to-carbon ratio which is defined as the number of mols of steam charged to the reforming zone per atom of carbon in the hydrocarbon feed charged. For example, a feed composition of 6 mols of steam per mol of propane corresponds to a steam-to-carbon ratio of 2.0. The term "minimum steam-to-carbon ratio" as used herein is that ratio below which sufficient carbon deposits on the catalyst to give an observable rise in the pressure drop across the catalyst bed. It has been found that in using the catalysts of this invention, minimum steam-to-carbon ratios as low as from about 1.0 to about 5.0 can be used without deleterious carbon formation on the catalyst. The specific minimum steam-to-carbon ratio is influenced by the particular feedstock and increases as the olefinic content and/or molecular weight of the feed increases. From the standpoint of operating without permanent deposition of deactivating amounts of carbon on the catalyst of this invention, there is no upper limit to the steam-to-carbon ratio and thus ratios as high as about 15 or higher can be used. For economic and practical reasons however the steam-to-carbon ratio is usually no higher than about 10. Within these levels of steam, the catalysts of this invention not only allow for the conversion of the hydrocarbon feed including otherwise difficultly reformed feeds such as olefinic and normally liquid fractions without plugging of the catalyst bed, but they are highly active leading to conversions of the hydrocarbon feed as high as 100 percent within the aforesaid range of the steam-to-carbon ratio.

The process of this invention is effected over a relatively wide range of operating conditions including a temperature between about 600° F. and about 1800° F. When hydrogen-containing gas consisting essentially of hydrogen and carbon oxides is desired the temperature is normally maintained between about 1000° F. and about 1800° F. and more usually between about 1200° F. and about 1600° F. Also included within the scope of this invention is the production of hydrogen-containing gas comprising up to about 60 mol percent of normally gaseous hydrocarbons such as methane, ethane, etc., and having a high calorific value such as between about 300 and about 1000 B.t.u. per standard cubic foot. The latter type of gaseous product, which is commonly referred to as town's gas, is produced within the lower temperature range of from about 600° F. to about 1000° F.

In operation it is preferred to preheat the feed prior to introduction to the catalyst bed. For example, heating of the hydrocarbon feedstock at a temperature from about 600° F. to about 1200° F. facilitates attainment and maintenance of suitable temperatures in the conversion zone. This is of some importance because if the feedstock initially contacts the catalyst at a low temperature an otherwise adequate steam-to-carbon ratio may not prevent carbon formation at or near entrance to the bed of the catalyst. Since catalytic steam reforming of hydrocarbons is an endothermic reaction there are practical limits to the amount of heat which can be added to maintain the suitable elevated operating temperatures in the reforming zone. It is preferred therefore to preheat the feedstock to as high a temperature as is consistent with avoiding pyrolysis or other heat deterioration of the feed.

The process is operable at atmospheric pressure and pressures above atmospheric without significant effect on the steam-to-carbon ratio. When steam reforming with the zirconia supported cobalt catalysts of this invention, the choice of a particular operating pressure is influenced primarily by the subsequent use of the gaseous hydrogen production. For many commercial uses of the hydrogen such as in ammonia synthesis the process is effected at superatmospheric pressure in order to maintain subsequent compression of the product at a minimum. Generally the catalytic reforming zone is operated at a pressure between about 0 and about 1000 pounds per square inch gauge (p.s.i.g.) and more usually at a pressure up to about 800 p.s.i.g. When operating at elevated pressures such as between about 200 and about 400 p.s.i.g., it is preferred to employ a steam-to-carbon ratio of between about 2 and about 4 in order to maintain a high conversion of hydrocarbon feed.

Space velocity in the catalytic reforming zone ranges between about 30 and about 1000 volumes of hydrocarbon expressed as $C_1$ equivalents per hour per volume of catalyst and more usually a space velocity of from about 100 to about 750 is employed.

The zirconia supported catalysts of this invention may be used in the form of lumps of irregular shapes, extrusions, rings, compressed pellets or powder including layers of these various physical forms. The operation may be as a fixed catalyst bed or a fluidized catalyst system. The steam required for the reforming may be premixed with the hydrocarbon feed or it may be admitted to the reaction zone by a separate line. The feed also may contain various inert materials such as nitrogen. Oxygen may be admitted to the reaction zone in an amount from about 0.2 to about 0.8 or more mols por mol of organic compound in the feed and may be admitted as an oxygen-rich gas or as air. When the hydrogen product is utilized for synthesis of ammonia, air is suitably employed.

The following examples are offered as a better understanding of the present invention and are not be construed as unnecessarily limiting thereto.

CATALYST I

Cobalt oxide on zirconia

The zirconia employed in the preparation of this catalyst has the following chemical composition: 94.78 weight percent zirconium dioxide, 4.29 weight percent calcium oxide, 0.57 weight percent silica, 0.27 weight percent titanium dioxide and 0.09 weight percent ferric oxide. Other characteristics of the zirconia include a porosity of 33–36 percent, an apparent specific gravity of 5.3–5.6 grams per cc. and a surface area of less than 1 square meter per gram. A 206.5 gram portion of this zirconia in the form of 12/20 mesh particles was impregnated with a solution prepared by dissolving 37.4 grams of cobalt nitrate hexahydrate (98 percent purity) in 50 ml. of distilled water. The impregnated mass was mixed thoroughly, dried in an oven at 212° F. with occasional stirring, and then calcined for two hours at 1000° F. Upon analysis, the calcined catalyst was found to contain 4.38 weight percent cobalt oxide.

The following Runs 1 through 8 were conducted in a reactor consisting of a one inch diameter quartz, tube fitted with an internal thermowell. In operation, 100 cc. (12/20 mesh) of catalyst was used to make up a catalyst bed 8 inches in length. The catalyst bed was located below 4 inches of Alundum chips used as the preheat zone. Before the start of the runs, the 100 cc. charge of catalyst was hydrogen pretreated for one hour at 1400° F. during which time at least a portion of the cobalt oxide was converted to elemental cobalt. Water was metered through a calibrated flow meter, vaporized and mixed with preheat hydrogen gas at the reactor inlet. When the steam flow was established, the hydrogen flow was stopped and the hydrocarbon feed cut in. During the reforming operation the catalyst temperature was measured at the top, middle and bottom of the catalyst bed. Effluent gases were passed through a condenser and receiver to collect unreacted water. After measuring in a wet test meter, the product gas was vented and the effluent gases were sampled and analyzed by gas chromatography and mass spectroscopy. Pressure drop across the catalyst bed was measured throughout each of the runs to give an indication of whether or not carbon was forming and plugging the bed as would be shown by a measurable rise in the reactor pressure drop across the catalyst bed. In the following Runs 1 through 8, Catalyst I, and a feed containing 34 mol percent of ethane and 66 mol percent of ethylene were used. The particular operating conditions employed and the results obtained are tabulated in the following Table I.

feed in this single pass operation was 100 percent. The results obtained with Catalyst I are plotted on the accompanying drawing as line labeled A which shows the relationship between the conversion of hydrocarbon feed and steam-to-carbon ratios. As indicated by line labeled A of the drawing, the conversion remained 100 percent notwithstanding variation of the steam-to-carbon ratio.

The catalysts of this invention possess superior reforming properties as compared with catalysts composed of the other iron group metals supported on zirconia as is demsonstrated by comparison of the results obtained with the above Catalyst I and the following Catalysts II and III.

CATALYST II

Nickel oxide on zirconia

A 241.5 gram portion of the zirconia employed in the preparation of Catalyst I above and in the form of 12/20 mesh particles, was impregnated with a solution containing 49.5 grams of nickel nitrate hexahydrate dissolved in 41 cc. of distilled water. The impregnated mass was mixed thoroughly and dried in an oven at 230° F. with intermittent stirring. The dried mass was then calcined for 2 hours at 1000° F. Upon analysis, the calcined composite was found to contain 4.64 weight percent nickel oxide.

CATALYST III

Iron oxide on zirconia

A 198 gram portion of the zirconia employed in the preparation of Catalyst I above and in the form of 12/20 mesh particles, was impregnated with a solution containing 58.0 grams of ferric nitrate monohydrate dissolved in 50 cc. of distilled water. The impregnated mass was mixed thoroughly, dried in an oven at 212° F. with occasional stirring, and then calcined for two hours at 1000° F. Upon analysis, the calcined composite was found to contain 5.21 weight percent iron oxide, expressed as FeO.

The above Catalysts II and III were tested using the above-described reactor and procedure and employing a

TABLE I

| Run Number | 1 | 2 | 3 | 4 | 5 | 6 | 7 | 8 |
|---|---|---|---|---|---|---|---|---|
| Feedstock | \multicolumn{8}{c}{34 mol percent ethane plus 66 mol percent ethylene} | | | | | | | |
| Catalyst: | | | | | | | | |
| Number | I | I | I | I | I | I | I | I |
| Composition | \multicolumn{8}{c}{4.38 weight percent cobalt oxide on zirconia} | | | | | | | |
| Volume, cc | 100 | 100 | 100 | 100 | 100 | 100 | 100 | 100 |
| Weight, grams | 181.5 | 181.5 | 181.5 | 181.5 | 181.5 | 181.5 | 181.5 | 181.5 |
| Operating Conditions: | | | | | | | | |
| Reactor Temperature, °F.: | | | | | | | | |
| Top | 1,205 | 1,202 | 1,194 | 1,205 | 1,181 | 1,181 | 1,180 | 1,185 |
| Middle | 1,402 | 1,401 | 1,393 | 1,392 | 1,385 | 1,385 | 1,388 | 1,400 |
| Bottom | 1,427 | 1,428 | 1,429 | 1,428 | 1,428 | 1,428 | 1,426 | 1,430 |
| Pressure, p.s.i.g | 0 | 0 | 0 | 0 | 0 | 0 | 0 | 0 |
| Flow Rate: | | | | | | | | |
| Cc. Hydrocarbon/minute | 34 | 57 | 71 | 91 | 108 | 106 | 105 | 103 |
| Cc. $H_2O$/minute | 0.59 | 0.62 | 0.61 | 0.62 | 0.60 | 0.49 | 0.36 | 0.36 |
| Space Velocity, Cc. $C_1$/hr./cc. catalyst | 41 | 68 | 86 | 109 | 130 | 127 | 126 | 124 |
| $H_2O/C$ Ratio | 11.6 | 8.6 | 5.7 | 4.6 | 3.7 | 3.1 | 2.3 | 1.9 |
| Run Time, minutes | 120 | 120 | 120 | 120 | 120 | 105 | 120 | 120 |
| Rate of Reactor Pressure Drop ($\Delta P$) Increase, inches $H_2O$/hour | 0 | 0 | 0 | 0 | 0 | 0 | 0 | 0 |
| Product Gas, mole percent: | | | | | | | | |
| $H_2$ | 76.4 | 75.7 | 75.2 | 74.8 | 74.3 | 74.2 | 73.4 | 72.9 |
| CO | 5.9 | 9.3 | 11.5 | 12.9 | 15.5 | 16.3 | 19.7 | 21.7 |
| $CO_2$ | 17.7 | 15.0 | 13.3 | 12.3 | 10.2 | 9.5 | 6.9 | 5.4 |
| Feed Conversion, Volume Percent | 100.0 | 100.0 | 100.0 | 100.0 | 100.0 | 100.0 | 100.0 | 100.0 |
| Minimum $H_2O/C$ ratio | | | | | | | | [1] <1.9 |

[1] Since no rise in the reactor pressure drop was observed at the indicated $H_2O/C_1$ ratio, the minimum ratio is below the actual operating $H_2O/C_1$ ratio employed in the run.

From the results of the above Table I, it is seen that the zirconia supported cobalt catalyst of this invention allowed for carbon-free conversion of the feed with steam over a wide range of steam-to-carbon ratios as observed by no rise in the pressure drop across the catalyst bed. In addition to operability at low levels of steam, the results of Table I show that in each run the conversion of feed composed of 32 mol percent of ethane and 68 mol percent of ethylene. The particular operating conditions used and the results obtained using Catalyst II are given in the following Table II and the conditions used and results obtained in testing Catalyst III are given in Table III.

TABLE II

| Run Number | 9 | 10 |
|---|---|---|
| Feedstock | (1) | (1) |
| Catalyst: | | |
| Number | (2) | (2) |
| Composition | (2) | (2) |
| Volume, cc | 100 | 100 |
| Weight, grams | 173.8 | 173.8 |
| Operating Conditions: | | |
| Reactor Temperature, °F.: | | |
| Top | 1,200 | 1,173 |
| Middle | 1,383 | 1,382 |
| Bottom | 1,422 | 1,428 |
| Pressure, p.s.i.g. | 0 | 0 |
| Flow rate: | | |
| Cc. hydrocarbon/minute | 32 | 51 |
| Cc. $H_2O$/minute | 0.55 | 0.55 |
| Space Velocity, cc. $C_1$/hr./cc. catalyst | 38 | 61 |
| $H_2O/C$ ratio | 11.6 | 7.3 |
| Run time, minutes | 120 | 105 |
| Rate of Reactor Pressure Drop Increase, inches $H_2O$/hr | 0 | 5.6 |
| Product Gas, mol percent: | | |
| $H_2$ | 76.6 | 75.9 |
| CO | 5.1 | 8.3 |
| $CO_2$ | 18.3 | 15.8 |
| $CH_4$ | | |
| $C_2$'s | | |
| Feed Conversion, Volume percent | 100.0 | 100.0 |
| Minimum $H_2O/C$ ratio | | 7.7 |

1 32 mol percent ethane plus 68 mol percent ethylene.
2 4.64 weight percent nickel on zirconia.

As seen from the results of Table II, Catalyst II containing nickel oxide supported on zirconia allowed for carbon free steam reforming at a steam-to-carbon ratio of 11.6 (Run No. 9) but when the ratio was lowered to 7.3 (Run No. 10), carbon deposition and plugging of the catalyst bed were severe as indicated by a rapid rise in the pressure drop across the catalyst bed. Based on this rate of pressure drop increase, the minimum steam-to-carbon ratio of Catalyst II is estimated as 7.7 which is at least 4 times greater than the minimum steam-to-carbon ratio for Catalyst I which was less than 1.9. This comparison of zirconia supported catalysts at substantially the same content of the cobalt and nickel components demonstrates that the catalyst of this invention is markedly superior in that it allows carbon free reforming at significantly lower steam requirements.

centration at approximately the same level. These catalysts are designated as Catalysts IV through VII and were prepared as follows.

CATALYST IV

Cobalt oxide on titania

Powdered titania (essentially all rutile) was mixed with 15 percent by weight of water and pelleted into ⅝" pellets. The pellets were dried at 240° F. and then fused for 2 hours at 2200° F. The pellets were crushed and screened to give 12/20 mesh particles. An aliquot of the crushed titania pellets (184.9 grams) was impregnated with an aqueous solution containing cobalt nitrate hexahydrate (33.9 grams) dissolved in 40 cc. of water. The impregnated mass was dried at 240° F. and calcined for two hours at 1000° F. Upon analysis the composite was found to contain 3.75 percent by weight of cobalt oxide, the balance of the catalyst being titania.

CATALYST V

Cobalt oxide on titania-alumina

A 117.5 gram portion of commercially available titania containing 90 weight percent titanium dioxide and 10 weight percent alumina in the form of 12/20 mesh particles, was impregnated with a solution containing 21.5 grams of cobalt nitrate hexahydrate dissolved in 35 cc. of distilled water. The impregnated mass was mixed thoroughly, dried at 230° F. with intermittent stirring, and then calcined for two hours at 1000° F. Upon analysis, the calcined composite was found to contain 4.4 weight percent cobalt oxide.

CATALYST VI

Cobalt oxide on alumina

The alumina employed in the preparation of this catalyst has an apparent porosity of 40–44 percent and an apparent specific gravity of 3.4–3.6 grams per cc. A 550 gram portion thereof in the form of 12/20 mesh particles was impregnated with a solution containing 98.4 grams

TABLE III

| Run Number | 11 | 12 | 13 | 14 | 15 | 16 | 17 | 18 |
|---|---|---|---|---|---|---|---|---|
| Feedstock | 32 mol percent ethane plus 68 mol percent ethylene | | | | | | | |
| Catalyst: | | | | | | | | |
| Number | III | III | III | III | III | III | III | III |
| Composition | 5.21 weight percent iron oxide on zirconia | | | | | | | |
| Volume, cc | 100 | 100 | 100 | 100 | 100 | 100 | 100 | 100 |
| Weight, grams | 174.4 | 174.4 | 174.4 | 174.4 | 174.4 | 174.4 | 174.4 | 174.4 |
| Operating Conditions: | | | | | | | | |
| Reactor Temperature, °F.: | | | | | | | | |
| Top | 1,239 | 1,242 | 1,232 | 1,227 | 1,239 | 1,230 | 1,239 | 1,248 |
| Middle | 1,405 | 1,403 | 1,404 | 1,400 | 1,408 | 1,405 | 1,409 | 1,408 |
| Bottom | 1,423 | 1,424 | 1,425 | 1,425 | 1,430 | 1,430 | 1,430 | 1,430 |
| Pressure, p.s.i.g. | 0 | 0 | 0 | 0 | 0 | 0 | 0 | 0 |
| Flow rate: | | | | | | | | |
| Cc. hydrocarbon/minute | 38 | 62 | 85 | 104 | 122 | 119 | 120 | 123 |
| Cc. $H_2O$/minute | 0.66 | 0.60 | 0.63 | 0.63 | 0.61 | 0.49 | 0.35 | 0.28 |
| Space Velocity, cc. $C_1$/hr./cc. catalyst | 46 | 74 | 102 | 125 | 147 | 143 | 144 | 148 |
| $H_2O/C$ ratio | 11.5 | 6.5 | 5.0 | 4.0 | 3.3 | 2.8 | 1.9 | 1.5 |
| Run time, minutes | 120 | 120 | 120 | 120 | 120 | 120 | 120 | 120 |
| Rate of Reactor Pressure Drop increase, inches $H_2O$/hr | 0 | 0 | 0 | 0 | 0 | 0 | 0 | 0 |
| Product Gas, mol percent | | | | | | | | |
| $H_2$ | 44.8 | 46.6 | 45.7 | 41.8 | 38.4 | 37.9 | 38.7 | 41.4 |
| CO | 7.9 | 10.4 | 10.5 | 9.6 | 8.4 | 7.2 | 6.5 | 7.0 |
| $CO_2$ | 7.4 | 6.0 | 5.7 | 5.3 | 5.1 | 6.0 | 6.8 | 7.0 |
| $CH_4$ | 1.3 | 0.9 | 0.6 | 1.1 | 1.2 | 2.1 | 2.6 | 3.3 |
| $C_2$'s | 38.6 | 36.1 | 37.5 | 42.3 | 46.9 | 46.8 | 45.4 | 41.3 |
| Feed Conversion, Volume percent | 17.5 | 19.4 | 18.3 | 16.0 | 13.5 | 13.9 | 14.9 | 17.4 |
| Minimum $H_2O/C$ | | | | | | | | <1.5 |

As shown by the results of Table III, Catalyst III containing iron oxide supported on zirconia, is a poor steam reforming catalyst in that, although it allowed for carbon-free reforming of the olefin feed at a steam-to-carbon ratio as low as 1.5, the conversion of feed in the single pass operation was less than 20 percent in each of the runs and did not improve over the prolonged on-stream period.

In order to test the effect of the support material on the properties of a cobalt-containing steam reforming catalyst, another series of catalysts was prepared in which the support was varied while maintaining the cobalt conof cobalt nitrate hexahydrate dissolved in 150 cc. of distilled water. After mixing thoroughly, the mixture was dried at 212° F. with occasional stirring, and then calcined for two hours at 1000° F. A 144 gram portion of the calcined composite was analyzed and found to contain 4.21 weight percent of cobalt oxide.

CATALYST VII

Cobalt oxide on cement-clay

A mixture of kaolin (25 weight percent), bentonite (20 weight percent), magnesia (12.5 weight percent) and a cement (42.5 weight percent) composed of calcium oxide, silica, magnesia, alumina and ferric oxide, in the form of 12/20 mesh particles and weighing 116.8 grams was impregnated with a solution prepared by dissolving 21.4 grams of cobalt nitrate hexahydrate (98 percent purity) in 60 cc. of distilled water. After mixing thoroughly, the mixture was dried at 240° F. and then calcined for two hours at 1000° F. Upon analysis, the calcined composite was found to contain 5.45 weight percent cobalt oxide.

Using the above described-reactor and procedure, Catalysts IV–VII were tested using an ethane-ethylene feed containing a major proportion of ethylene. The specific feedstock, operating conditions and results obtained with each catalyst are given in the following Tables IV through VII, respectively.

TABLE IV

| Run Number | 19 | 20 | 21 | 22 | 23 | 24 | 25 | 26 |
|---|---|---|---|---|---|---|---|---|
| Feedstock | 32 mol percent ethane plus 68 mol percent ethylene | | | | | | | |
| Catalyst: | | | | | | | | |
| Number | IV | IV | IV | IV | IV | IV | IV | IV |
| Composition | 3.75 weight percent cobalt oxide on titania | | | | | | | |
| Volume, cc | 100 | 100 | 100 | 100 | 100 | 100 | 100 | 100 |
| Weight, grams | 184.1 | 184.1 | 184.1 | 184.1 | 184.1 | 184.1 | 184.1 | 184.1 |
| Operating Conditions: | | | | | | | | |
| Reactor Temperature, °F.: | | | | | | | | |
| Top | | | 1,250 | 1,260 | 1,245 | 1,260 | 1,275 | 1,260 |
| Middle | 1,401 | 1,400 | 1,395 | 1,400 | 1,395 | 1,405 | 1,400 | 1,390 |
| Bottom | 1,425 | 1,425 | 1,420 | 1,420 | 1,418 | 1,420 | 1,418 | 1,420 |
| Pressure, p.s.i.g | 0 | 0 | 0 | 0 | 0 | 0 | 0 | 0 |
| Flow rate: | | | | | | | | |
| Cc. hydrocarbon/minute | 59 | 60 | 117 | 116 | 106 | 121 | 118 | 103 |
| Cc. $H_2O$/minute | 0.72 | 0.74 | 0.61 | 0.77 | 0.84 | 0.62 | 0.52 | 0.25 |
| Space Velocity, cc. $C^1$/hr./cc. catalyst | 71 | 72 | 140 | 139 | 127 | 145 | 141 | 123 |
| $H_2O$/C ratio | 8.2 | 8.2 | 3.5 | 4.4 | 5.3 | 3.4 | 2.5 | 1.6 |
| Run time, minutes | 165 | 105 | 105 | 120 | 120 | 120 | 120 | 130 |
| Rate of Reactor Pressure Drop increase, inches $H_2O$/hr | 0 | 0 | 0 | 0 | 0 | 0 | 0 | 0 |
| Product Gas, mol percent: | | | | | | | | |
| $H_2$ | 22.0 | 25.5 | 61.1 | 32.5 | 48.7 | 64.9 | 62.9 | 71.1 |
| CO | 4.1 | 5.8 | 19.7 | 8.7 | 13.8 | 18.3 | 18.3 | 20.7 |
| $CO_2$ | 3.6 | 3.3 | 3.5 | 3.2 | 4.2 | 5.6 | 5.0 | 5.6 |
| $CH_4$ | 1.1 | 1.4 | 0.6 | 0.6 | 1.0 | 0.6 | 0.6 | 0.4 |
| $C_2$'s | 69.2 | 64.0 | 15.1 | 55.0 | 32.3 | 10.6 | 13.2 | 2.2 |
| Feed Conversion, Volume percent | 6.0 | 8.9 | 44.1 | 10.2 | 22.7 | 53.6 | 47.6 | 85.9 |

TABLE V

| Run Number | 27 | 28 | 29 | 30 | 31 | 32 | 33 | 34 | 35 | 36 |
|---|---|---|---|---|---|---|---|---|---|---|
| Feedstock | 32.2 mol percent ethane plus 67.8 mol percent ethylene | | | | | | | | | |
| Catalyst: | | | | | | | | | | |
| Number | V | V | V | V | V | V | V | V | V | V |
| Composition | 4.3 weight percent cobalt oxide on titania/alumina | | | | | | | | | |
| Volume, cc | 100 | 100 | 100 | 100 | 100 | 100 | 100 | 100 | 100 | 100 |
| Weight, grams | 108.7 | 108.7 | 108.7 | 108.7 | 108.7 | 108.7 | 108.8 | 108.7 | 108.7 | 108.7 |
| Operating Conditions: | | | | | | | | | | |
| Reactor Temperature, °F: | | | | | | | | | | |
| Top | 1,275 | 1,275 | 1,269 | 1,267 | 1,263 | 1,273 | 1,270 | 1,277 | 1,287 | 1,295 |
| Middle | 1,402 | 1,400 | 1,400 | 1,395 | 1,397 | 1,405 | 1,402 | 1,406 | 1,417 | 1,385 |
| Bottom | 1,427 | 1,422 | 1,425 | 1,422 | 1,425 | 1,423 | 1,425 | 1,420 | 1,420 | 1,430 |
| Pressure, p.s.i.g | 0 | 0 | 0 | 0 | 0 | 0 | 0 | 0 | 0 | 0 |
| Flow rate: | | | | | | | | | | |
| Cc. hydrocarbon/minute | 43 | 66 | 82 | 109 | 131 | 126 | 125 | 112 | 107 | 106 |
| Cc. $H_2O$/minute | 0.71 | 0.62 | 0.59 | 0.69 | 0.69 | 0.50 | 0.47 | 0.30 | 0.25 | 0.24 |
| Space Velocity, cc. $C^1$/hr./cc. catalyst | 52 | 79 | 98 | 131 | 157 | 151 | 150 | 134 | 128 | 128 |
| $H_2O$/C ratio | 11.0 | 6.3 | 4.7 | 4.2 | 3.5 | 2.6 | 2.1 | 1.8 | 1.6 | 1.5 |
| Run time, minutes | 120 | 135 | 130 | 120 | 120 | 120 | 120 | 45 | 45 | 30 |
| Rate of Reactor Pressure Drop increase, inches $H_2O$/hr | 0 | 0 | 0 | 0 | 0 | 0 | 0 | 0 | 0 | 0 |
| Product Gas, mol percent: | | | | | | | | | | |
| $H_2$ | 53.1 | 47.5 | 48.1 | 42.2 | 41.2 | 44.4 | 45.5 | 59.8 | 67.6 | 68.7 |
| CO | 1.4 | 2.3 | 3.8 | 3.1 | 3.2 | 4.1 | 5.3 | 10.4 | 17.9 | 19.5 |
| $CO_2$ | 15.1 | 12.9 | 11.8 | 10.6 | 10.3 | 10.6 | 10.2 | 10.3 | 6.9 | 6.1 |
| $CH_4$ | 6.1 | 6.2 | 5.6 | 5.1 | 5.3 | 6.4 | 6.8 | 4.8 | 3.2 | 2.3 |
| $C_2$'s | 24.3 | 31.1 | 30.7 | 39.0 | 40.0 | 34.5 | 32.2 | 14.7 | 4.4 | 3.4 |
| Feed Conversion, Volume percent | 31.8 | 25.6 | 24.9 | 19.5 | 19.1 | 23.4 | 24.7 | 46.3 | 76.1 | 80.4 |

TABLE VI

| Run Number | 37 | 38 | 39 | 40 | 41 | 42 | 43 | 44 |
|---|---|---|---|---|---|---|---|---|
| Feedstock | 34 mol percent ethane plus 66 mol percent ethylene | | | | | | | |
| Catalyst: | | | | | | | | |
| Number | VI | VI | VI | VI | VI | VI | VI | VI |
| Composition | 4.2 weight percent cobalt oxide on alumina | | | | | | | |
| Volume, cc | 100 | 100 | 100 | 100 | 100 | 100 | 100 | 100 |
| Weight, grams | 109 | 109 | 109 | 109 | 109 | 109 | 109 | 109 |
| Operating Conditions: | | | | | | | | |
| Reactor Temperature, °F.: | | | | | | | | |
| Top | 1,273 | 1,272 | 1,268 | 1,262 | 1,275 | 1,265 | 1,254 | 1,240 |
| Middle | 1,418 | 1,416 | 1,419 | 1,413 | 1,383 | 1,385 | 1,405 | 1,400 |
| Bottom | 1,430 | 1,428 | 1,430 | 1,427 | 1,428 | 1,430 | 1,427 | 1,428 |
| Pressure, p.s.i.g | 0 | 0 | 0 | 0 | 0 | 0 | 0 | 0 |
| Flow rate: | | | | | | | | |
| Cc. hydrocarbon/minute | 71 | 74 | 86 | 103 | 106 | 110 | 107 | 104 |
| Cc. $H_2O$/minute | 0.78 | 0.65 | 0.65 | 0.64 | 0.62 | 0.46 | 0.35 | 0.23 |
| Space Velocity, cc. $C^1$/hr./cc. catalyst | 85 | 89 | 104 | 124 | 128 | 132 | 129 | 125 |
| $H_2O$/C ratio | 7.4 | 5.8 | 5.1 | 4.1 | 3.9 | 2.8 | 2.2 | 1.5 |
| Run time, minutes | 120 | 120 | 120 | 120 | 120 | 120 | 120 | 120 |
| Rate of Reactor Pressure Drop increase, inches $H_2O$/hr | 0 | 0 | 0 | 0 | 0 | 0 | 0 | |
| Product Gas, mol percent | | | | | | | | |
| $H_2$ | 14.2 | 47.5 | 50.0 | 49.0 | 71.0 | 71.6 | 71.8 | 71.7 |
| CO | 2.1 | 7.4 | 8.5 | 8.3 | 13.7 | 14.1 | 17.2 | 14.0 |
| $CO_2$ | 2.7 | 8.4 | 8.3 | 8.2 | 10.6 | 10.4 | 8.2 | 3.3 |
| $CH_4$ | 0.7 | 0.4 | 0.3 | 0.4 | | | | |
| $C_2$'s | 80.3 | 36.3 | 32.9 | 34.1 | 4.7 | 3.9 | 2.8 | 1.0 |
| Feed Conversion, Volume percent | 3.3 | 19.1 | 20.6 | 20.0 | 72.1 | 75.8 | 81.9 | 93.2 |

TABLE VII

| Run Number | 45 | 46 | 47 | 48 | 49 | 50 | 51 | 52 | 53 | 54 | 55 | 56 |
|---|---|---|---|---|---|---|---|---|---|---|---|---|
| Feedstock | 34 mol percent ethane plus 66 mol percent ethylene | | | | | | | | | | | |
| Catalyst: | | | | | | | | | | | | |
| Number | VII | VII | VII | VII | VII | VII | VII | VII | VII | VII | VII | VII |
| Composition | 5 weight percent cobalt oxide on cement/clay support | | | | | | | | | | | |
| Volume, cc | 100 | 100 | 100 | 100 | 100 | 100 | 100 | 100 | 100 | 100 | 100 | 100 |
| Weight, grams | 93.8 | 93.8 | 93.8 | 93.8 | 93.8 | 93.8 | 93.8 | 93.8 | 93.8 | 93.8 | 93.8 | 93.8 |
| Operating Conditions: | | | | | | | | | | | | |
| Reactor Temperature, °F | | | | | | | | | | | | |
| Top | 1,225 | 1,202 | 1,208 | 1,200 | 1,198 | 1,210 | 1,194 | 1,196 | 1,230 | 1,236 | 1,239 | 1,233 |
| Middle | 1,397 | 1,384 | 1,389 | 1,387 | 1,392 | 1,395 | 1,386 | 1,387 | 1,400 | 1,407 | 1,412 | 1,404 |
| Bottom | 1,430 | 1,427 | 1,429 | 1,429 | 1,430 | 1,430 | 1,428 | 1,426 | 1,425 | 1,426 | 1,419 | |
| Pressure, p.s.i.g | 0 | 0 | 0 | 0 | 0 | 0 | 0 | 0 | 0 | 0 | 0 | 0 |
| Flow rate: | | | | | | | | | | | | |
| Cc. hydrocarbon/minute | 44 | 41 | 67 | 90 | 108 | 133 | 128 | 126 | 108 | 129 | 116 | 123 |
| Cc. $H_2O$/minute | 0.65 | 0.64 | 0.62 | 0.59 | 0.55 | 0.64 | 0.53 | 0.34 | 0.33 | 0.30 | 0.29 | 0.30 |
| Space Velocity, cc. $C_1$/hr./cc catalyst | 53 | 49 | 80 | 108 | 130 | 159 | 154 | 151 | 129 | 155 | 139 | 147 |
| $H_2O$/C ratio | 9.8 | 10.4 | 6.2 | 4.4 | 3.4 | 3.2 | 2.7 | 1.8 | 2.0 | 1.6 | 1.7 | 1.6 |
| Run time, minutes | 50 | 70 | 120 | 120 | 120 | 120 | 120 | 120 | 60 | 75 | 60 | 60 |
| Rate of Reactor Pressure Drop increase, inches $H_2O$/hr | 0 | 0 | 0 | 0 | 0 | 0 | 0 | 0 | 0 | 0 | 0 | 0 |
| Product Gas, mol percent: | | | | | | | | | | | | |
| $H_2$ | 39.3 | 26.3 | 19.5 | 15.0 | 14.3 | 15.4 | 14.7 | 12.3 | 55.8 | 58.1 | 63.2 | 62.6 |
| CO | 0.9 | 0.5 | 0.6 | 0.9 | 1.5 | 1.7 | 2.1 | 1.6 | 10.7 | 11.2 | 14.7 | 14.4 |
| $CO_2$ | 11.2 | 7.7 | 5.7 | 4.2 | 3.6 | 3.7 | 3.2 | 2.8 | 8.6 | 8.8 | 7.6 | 7.8 |
| $CH_4$ | 4.2 | 3.5 | 3.8 | 3.8 | 4.3 | 3.7 | 3.8 | 3.4 | 2.4 | 1.7 | 0.9 | 1.1 |
| $C_3H_8$ | | | 0.2 | 0.2 | 0.2 | 0.2 | 0.3 | 0.4 | | | | |
| $C_2$'s | 44.4 | 62.0 | 70.2 | 75.9 | 76.1 | 75.3 | 75.9 | 79.5 | 22.5 | 20.2 | 13.6 | 14.1 |
| Feed Conversion, Volume percent | 15.5 | 9.0 | 6.7 | 7.3 | 5.9 | 6.1 | 6.2 | 5.7 | 32.5 | 34.9 | 46.0 | 45.3 |

As shown by the results tabulated in the above Tables IV through VII, although catalysts composed of cobalt supported on titania, titania-alumina, alumina and an aluminous cement, allow for carbon-free steam reforming of the olefinic feed at low steam-to-carbon ratios, the conversion of feed in each instance was substantially less than 100 percent. In addition, the steam-to-carbon ratio had a marked effect on the conversion of feed and, in general, the higher feed conversions were obtained only at the very low steam-to-carbon ratios. These results obtained with Catalysts IV–VII are graphically illustrated by lines labeled B, C, D and E, respectively, of the accompanying drawing. Such a marked effect of the steam-to-carbon ratio on feed conversion and the ability to achieve an improved conversion only at very low steam levels is an undesirable combination of properties for several reasons. Thus, even at the low levels of steam requirements, the conversions per pass are less than 100 percent requiring separating of unconverted feed and recycle to the reaction zone. In addition, in continuous operation the reaction is usually not effected at the minimum steam-to-carbon ratios but rather using at least a 50 percent excess as a safety factor so that the steam level does not fall below the minimum during normal fluctuations in the steam feed line. A further disadvantage of Catalysts IV–VII is that they are unsuitable for use at an elevated operating pressure since an increase in pressure usually lowers the conversion further unless the steam concentration of the feed is increased. Since the use of elevated pressures usually requires operation at a steam-to-carbon ratio of between about 3 and about 4, it is seen from lines labeled B–E of the drawing, that the conversions obtained with Catalysts IV–VII within this range are unsatisfactory.

From the results obtained with Catalysts II through VII above, it is apparent that the desirable combination of properties of the catalysts of this invention, as exemplified by Catalyst I, are not attributable solely to the presence of the cobalt component or to the zirconia support but rather to a peculiar co-action between the two. Another catalyst falling within the scope of the present invention is the following Catalyst VIII composed of cobalt oxide on zirconia and containing about twice the cobalt oxide content of Catalyst I. Catalyst VIII was tested using the same reactor and procedure described above with reference to the testing of Catalyst I, the particular conditions employed and results obtained being tabulated in the following Table VIII.

CATALYST VIII

Cobalt oxide on zirconia

A 171.9 gram portion of zirconia in the form of 12/20 mesh particles was soaked for fifteen minutes in an aqueous solution of cobalt nitrate hexahydrate having a density of 1.13 grams of the salt per cc. The excess liquid was decanted and the remaining mixture was dried at 240° F. with stirring. The dried composite was soaked in another portion of the cobalt nitrate solution for fif-

TABLE VIII

| Run Number | 57 | 58 | 59 | 60 | 61 | 62 | 63 | 64 |
|---|---|---|---|---|---|---|---|---|
| Feedstock | 32 mol percent ethane plus 68 mol percent ethylene | | | | | | | |
| Catalyst: | | | | | | | | |
| Number | VIII | VIII | VIII | VIII | VIII | VIII | VIII | VIII |
| Composition | 8.9 percent cobalt oxide on zirconia | | | | | | | |
| Volume, cc | 100 | 100 | 100 | 100 | 100 | 100 | 100 | 100 |
| Weight, grams | 183.4 | 183.4 | 183.4 | 183.4 | 183.4 | 183.4 | 183.4 | 183.4 |
| Operating Conditions: | | | | | | | | |
| Reactor Temperature, °F.: | | | | | | | | |
| Top | 1,227 | 1,295 | 1,300 | 1,305 | 1,268 | 1,227 | 1,210 | 1,240 |
| Middle | 1,380 | 1,377 | 1,400 | 1,405 | 1,390 | 1,380 | 1,379 | 1,394 |
| Bottom | 1,415 | 1,408 | 1,400 | 1,420 | 1,411 | 1,415 | 1,420 | 1,424 |
| Flow rate: | | | | | | | | |
| Cc. Hydrocarbon/minute | 28 | 59 | 80 | 60 | 71 | 93 | 100 | 108 |
| Cc. $H_2$/minute | 0.76 | 0.73 | 0.66 | 0.71 | 0.78 | 0.77 | 0.77 | 0.64 |
| Space Velocity, cc. $C_1$/hr./cc Catalyst | 34 | 71 | 95 | 72 | 85 | 111 | 110 | 130 |
| $H_2O$/C Ratio | 17.8 | 8.2 | 5.5 | 7.8 | 7.3 | 5.6 | 4.7 | 3.9 |
| Run time, minutes | 90 | 55 | 15 | 30 | 100 | 100 | 120 | 165 |
| Pressure, p.s.i.g | 0 | 0 | 0 | 0 | 0 | 0 | 0 | 0 |
| Rate of Reactor Pressure Drop ($\Delta P$) Increase, inches $H_2O$/hour | 0 | 0 | 0 | 0 | 0 | 0 | 0 | 1.7 |
| Product Gas, mole percent: | | | | | | | | |
| $H_2$ | 76.9 | 75.3 | 69.4 | 60.9 | 75.8 | 75.4 | 75.1 | 74.6 |
| CO | 3.8 | 7.3 | 9.6 | 11.1 | 8.7 | 10.6 | 11.6 | 14.1 |
| $CO_2$ | 19.3 | 16.5 | 10.2 | 2.5 | 15.5 | 14.0 | 13.3 | 11.3 |
| $CH_4$ | | | | 0.6 | | | | |
| $C_2$'s | | | trace | 24.9 | | | | |
| | | 0.9 | 10.8 | | | | | |
| Feed Conversion, Volume percent | 100.0 | 93.0 | 47.8 | 22.2 | 100.0 | 100.0 | 100.0 | 100.0 |
| Minimum $H_2O$/C ratio | | | | | | | | 4.0 | teen minutes and was dried with stirring after which the mass was again soaked in the solution for 1 hour and dried. After the third treatment, the dried mass was calcined for two hours at 1000° F. Upon analysis, it was found that the calcined composite contained 8.9 weight percent cobalt oxide.

Inspection of the results of Table VIII shows that the conversion of hydrocarbon feed was 100 percent during the first 90 minute on stream period (Run No. 57). During the next 100 minute period, the conversion dropped below 100 percent but after this preliminary on-stream period, the conversion of the hydrocarbon feed again reached 100 percent and remained at that level during the subsequent prolonged steam reforming operation. Thus Catalyst VIII also allowed for 100 percent conversions of the olefinic feed which was not achieved with any of Catalysts III–VII notwithstanding the fact that the latter catalyst had been on stream for a prolonged period of time.

It is apparent that a new and improved two component contact material is provided by the present invention and that the catalyst also leads to significant improvement in the reforming of hydrocarbons with steam to produce hydrogen-rich gas, and particularly of feeds which are otherwise only difficultly reformed using other two component contact materials.

It is to be understood that various alterations and modifications of the teachings of this invention may be made without departing from the scope of this invention.

Having described our invention, we claim:

1. A process for the carbon-free steam reforming of hydrocarbons to produce hydrogen-containing gaseous product which comprises contacting a hydrocarbon and steam at a temperature between about 600° F. and about 1800° F. in the presence of a catalyst consisting of a cobalt component on zirconia, the cobalt component being present in an amount between about 0.5 and about 15 weight percent, expressed as cobalt oxide and based on the total weight of the catalyst, under conditions such that hydrogen containing gaseous product is produced.

2. A process for the carbon-free steam reforming of an olefinic feed to produce hydrogen-containing gas which comprises contacting steam and a feed containing between about 5 and about 90 mol percent of olefin at a temperature between about 600° F. and about 1800° F. in the presence of a catalyst consisting of a cobalt component on a zirconia support, said cobalt component being selected from the group consisting of elemental cobalt, cobalt oxide and mixtures thereof and being present in an amount between about 0.5 and about 15 weight percent, expressed as cobalt oxide and based on the total weight of the catalyst, under conditions such that hydrogen-containing gaseous product is produced.

3. The process of claim 2 in which said feed comprises ethylene.

4. The process of claim 2 in which said feed comprises propylene.

5. A process for the carbon-free steam reforming of normally liquid hydrocarbons to produce hydrogen-containing gas which comprises contacting steam and a normally liquid hydrocarbon-containing feed at a temperature between about 600° F. and about 1800° F. in the presence of a catalyst consisting of a cobalt component on a zirconia support, said cobalt component being selected from the group consisting of elemental cobalt, cobalt oxide and mixtures thereof and being present in amount between about 0.5 and about 15 weight percent, expressed as cobalt oxide and based on the total weight of the catalyst, under conditions such that hydrogen-containing gas is produced.

6. The process of claim 5 in which said hydrocarbon feed is a naphtha fraction.

7. A catalytic composition of matter consisting of a cobalt component selected from the group consisting of elemental cobalt, cobalt oxide and mixtures thereof on a support containing at least 90 percent by weight of zirconium dioxide and at least one compound of the group consisting of calcium oxide and magnesium oxide present in an amount up to 6 percent by weight of the support, said cobalt component being present in an amount between about 0.5 and about 15 percent by weight, expressed as cobalt oxide, of the total weight of the composition.

8. A process for the production of hydrogen-containing gas which comprises introducing steam and a feed containing hydrocarbons to a steam reforming reaction zone, in said reforming reaction zone contacting said steam and feed containing hydrocarbons at a temperature between about 1000° F. and about 1800° F. in the presence of a catalyst consisting of a cobalt component on a support, said cobalt component being selected from the group consisting of elemental cobalt, cobalt oxide and mixtures thereof and being present in an amount between about 0.5 and about 15 weight percent, expressed as cobalt oxide and based on the total weight of the catalyst, said support containing at least 90 percent by weight of zirconium dioxide and at least one component selected from the group consisting of calcium oxide and magnesium oxide present in an amount up to 6 weight percent of the weight of the support, under conditions such that hydrogen-containing gas is produced and substantially no permanent deposition of free carbon on the catalyst occurs, and withdrawing gaseous effluent containing hydrogen from the steam reforming reaction zone.

9. A process for the carbon-free steam reforming of hydrocarbons to produce hydrogen which comprises introducing steam and a hydrocarbon to a steam reforming reaction zone, in said reforming reaction zone contacting said steam and hydrocarbon at a temperature between about 1200° F. and about 1600° F. and at a pressure up to about 800 pounds per square inch gauge in the presence of a catalyst consisting of a cobalt component on a support, said cobalt component being selected from the group consisting of elemental cobalt, cobalt oxide and mixtures thereof and being present in an amount between about 1 and about 10 weight precent based on the total weight of the catalyst and expressed as cobalt oxide, said support containing zirconium dioxide in an amount of at least 90 weight percent of the support and a component selected from at least one of the group consisting of calcium oxide and magnesium oxide in an amount up to 6 weight percent of the support, to produce gaseous product consisting essentially of hydrogen and carbon oxides, the number of mols of steam charged to the reforming zone per atom of carbon in the hydrocarbon charged to the reforming zone being at least one and sufficient to substantially prevent permanent deposition of carbon on the catalyst.

10. A process for the carbon-free steam reforming of hydrocarbons to produce hydrogen-containing gaseous product which comprises introducing steam and a feed containing hydrocarbons to a steam reforming reaction zone, in said reforming reaction zone contacting said steam and feed containing hydrocarbons at a temperature between about 1000° F. and about 1800° F. in the presence of a catalyst consisting of a cobalt component on a support, said cobalt component being selected from the group consisting of elemental cobalt, cobalt oxide and mixtures thereof and being present in an amount between about 0.5 and about 15 weight percent, expressed as cobalt oxide and based on the total weight of the catalyst, said support containing at least 90 percent by weight of zirconium dioxide, to produce gaseous product comprising hydrogen, the number of mols of steam charged to the reforming zone per atom of carbon in the hydrocarbon charged to the reforming zone being at at least one and sufficient to substantially prevent permanent deposition of carbon on the catalyst.

(References on following page)

References Cited

UNITED STATES PATENTS

| | | | | |
|---|---|---|---|---|
| 3,235,515 | 2/1966 | Taylor | | 252—472 |
| 3,027,238 | 3/1962 | Watkins | | 23—212 |
| 3,129,060 | 4/1964 | Pohlenz | | 23—212 |
| 3,197,284 | 7/1965 | Hoekstra | | 23—212 |
| 3,216,801 | 11/1965 | Hoekstra | | 23—212 |

OSCAR R. VERTIZ, *Primary Examiner.*

EDWARD STERN, *Examiner.*

UNITED STATES PATENT OFFICE
CERTIFICATE OF CORRECTION

Patent No. 3,385,670

May 28, 1968

James P. Van Hook et al.

It is certified that error appears in the above identified patent and that said Letters Patent are hereby corrected as shown below:

Column 1, line 47, "as" should read -- to --. Column 7, TABLE II, in the columns, heading 9 and 10, line 1 thereof, cancel "II", each occurrence; same table, same columns, line 2 thereof, "(2)", each occurrence, should read -- II --; same table, under heading 10, line 6 thereof, "1.173" should read -- 1,173 --; same table, same column, line 7 thereof, "1.382" should read -- 1,382 --; same table, same column, line 8 thereof, "1.428" should read -- 1,428 --; same table, first column, line 25 thereof, "Feed Con ersion" should read -- Feed Conversion --. Columns 7 and 8, TABLE III, fifth column, line 19 thereof, "42.3" should read -- 42.2 --; same table, ninth column, line 14 thereof, "41.1" should read -- 41.3 --; same table, same column, line 15 thereof, "7.0" should read -- 7.4 --; same table, same column, line 17 thereof, "3.3" should read -- 3.0 --. Columns 9 and 10, TABLE VI, ninth column, after line 12, insert -- 0 --; same table, same column, line 14 thereof, "14.0" should read -- 24.0 --. Columns 11 and 12, TABLE VII, first column, line 24 thereof, "CH" should read -- $CH_4$ --. Column 11, line 43, "separating" should read -- separation --. Columns 11 and 12, TABLE VIII, eighth column, line 8 thereof, "100" should read -- 110 --; same table, first column, line 13 thereof, "Cc. $H_2$/minute" should read -- Cc. $H_2O$/minute --; same table, fourth column, line 10 thereof, "95" should read -- 96 --; same table, sixth column, line 12 thereof, "100" should read -- 110 --; same table, first column, line 24 thereof, "CH" should read -- $CH_4$ --. Column 13, line 66, after "in" insert -- an --.

Signed and sealed this 7th day of April 1970.

(SEAL)
Attest:

EDWARD M. FLETCHER, JR.
Attesting Officer

WILLIAM E. SCHUYLER, JR.
Commissioner of Patents